(12) United States Patent
Renegar

(10) Patent No.: US 11,097,676 B2
(45) Date of Patent: Aug. 24, 2021

(54) UNIFORM DECELERATION UNIT

(71) Applicant: Tesseract Structural Innovations, Inc., Fayetteville, AR (US)

(72) Inventor: Henry L. Renegar, Fayetteville, AR (US)

(73) Assignee: Tesseract Structural Innovations, Inc., Fayetteville, AR (US)

( * ) Notice: Subject to any disclaimer, the term of this patent is extended or adjusted under 35 U.S.C. 154(b) by 0 days.

(21) Appl. No.: 16/590,764

(22) Filed: Oct. 2, 2019

(65) Prior Publication Data

US 2020/0101912 A1 Apr. 2, 2020

Related U.S. Application Data

(63) Continuation of application No. 15/529,017, filed as application No. PCT/US2015/062366 on Nov. 24, 2015, now Pat. No. 10,556,559.

(60) Provisional application No. 62/083,403, filed on Nov. 24, 2014.

(51) Int. Cl.
*B60R 19/00* (2006.01)
*B60R 13/08* (2006.01)
*B62D 25/18* (2006.01)
*B60J 5/04* (2006.01)

(52) U.S. Cl.
CPC ............ *B60R 19/00* (2013.01); *B60J 5/0461* (2013.01); *B60R 13/0861* (2013.01); *B60R 2019/002* (2013.01); *B62D 25/18* (2013.01)

(58) Field of Classification Search
CPC ... B60R 19/00; B60R 19/18; B60R 2019/002; B60R 2019/1866; B60R 13/0861; B60J 5/0461; B62D 25/18; B62D 21/15; B62D 21/152

USPC ................. 296/198, 187.03, 187.1, 187.09
See application file for complete search history.

(56) References Cited

U.S. PATENT DOCUMENTS

| | | | |
|---|---|---|---|
| 4,029,350 A | 6/1977 | Goupy et al. |
| 4,190,275 A | 2/1980 | Mileti |
| 4,352,484 A | 10/1982 | Gertz et al. |
| 4,822,011 A | 4/1989 | Goldbach et al. |
| 4,934,751 A | 6/1990 | Shimada |
| 5,547,737 A | 8/1996 | Evans et al. |
| 5,906,410 A | 5/1999 | Dalinkiewicz |
| 6,007,123 A | 12/1999 | Schwartz et al. |

(Continued)

FOREIGN PATENT DOCUMENTS

| | | | |
|---|---|---|---|
| CA | 2422415 A1 | 9/2003 |
| DE | 10 2008 062505 A1 | 8/2009 |

(Continued)

OTHER PUBLICATIONS

Computer translation of JP 2007-045352 (Year: 2007).*

(Continued)

*Primary Examiner* — Gregory A Blankenship
(74) *Attorney, Agent, or Firm* — Wolf, Greenfield & Sacks, P.C.

(57) ABSTRACT

An apparatus and method for improving the safety and performance of an automobile in crash events is disclosed. The apparatus includes a front crash pad, rear crash pad, and a connection beam. Both crash pads and the connection beam are coupled to an automobile in such fashion as to absorb and dissipate energy by converting kinetic energy into strain energy.

20 Claims, 22 Drawing Sheets

(56) References Cited

U.S. PATENT DOCUMENTS

| | | | |
|---|---|---|---|
| 6,142,563 A | 11/2000 | Townsend et al. | |
| 6,179,355 B1 | 1/2001 | Chou et al. | |
| 6,270,131 B1 | 8/2001 | Martinez et al. | |
| 6,286,867 B1 | 9/2001 | Braemig et al. | |
| 6,341,813 B1 | 1/2002 | Taghaddos | |
| 6,547,295 B2 | 4/2003 | Vismara | |
| 6,726,258 B1 | 4/2004 | Sundgren et al. | |
| 6,729,451 B2 | 5/2004 | Yamagiwa | |
| 6,758,507 B2 | 7/2004 | Tarahomi | |
| 6,840,301 B2 | 1/2005 | Nichol et al. | |
| 6,866,084 B2 | 3/2005 | Asholt et al. | |
| 6,932,146 B2 | 8/2005 | Nichol et al. | |
| 6,998,535 B2 | 2/2006 | Nichol | |
| 7,114,764 B1 | 10/2006 | Barsoum et al. | |
| 7,341,277 B2 | 3/2008 | Huttsell et al. | |
| 8,684,427 B2 | 4/2014 | Marur et al. | |
| 8,864,216 B2 * | 10/2014 | Nagwanshi | B62D 29/004 296/187.03 |
| 8,979,146 B2 | 3/2015 | Kano et al. | |
| 9,394,005 B1 | 7/2016 | Enders | |
| 10,556,559 B2 * | 2/2020 | Renegar | B60R 13/0861 |
| 2002/0012771 A1 | 1/2002 | Fiorinelli et al. | |
| 2002/0017805 A1 | 2/2002 | Carroll, III et al. | |
| 2002/0047281 A1 | 4/2002 | Hartel et al. | |
| 2002/0053805 A1 | 5/2002 | Azuchi et al. | |
| 2003/0030290 A1 | 2/2003 | Yamagiwa | |
| 2003/0141712 A1 | 7/2003 | Miyasaka | |
| 2004/0046404 A1 | 3/2004 | Kim | |
| 2005/0218696 A1 | 10/2005 | Aase et al. | |
| 2006/0021697 A1 | 2/2006 | Riley et al. | |
| 2006/0082168 A1 | 4/2006 | Joosten et al. | |
| 2007/0096507 A1 | 5/2007 | Brunner et al. | |
| 2007/0176440 A1 | 8/2007 | Henseleit | |
| 2008/0150273 A1 | 6/2008 | Sugiyama et al. | |
| 2008/0309103 A1 | 12/2008 | Frederick et al. | |
| 2009/0152901 A1 * | 6/2009 | Takeuchi | B62D 25/161 296/203.01 |
| 2009/0243315 A1 | 10/2009 | Goldsberry | |
| 2009/0289465 A1 | 11/2009 | Heo | |
| 2010/0201139 A1 | 8/2010 | Hashimura | |
| 2011/0095549 A1 | 4/2011 | Moen et al. | |
| 2011/0101714 A1 | 5/2011 | Bator | |
| 2011/0121587 A1 | 5/2011 | Handing et al. | |
| 2011/0193369 A1 | 8/2011 | Wuest et al. | |
| 2011/0210579 A1 | 9/2011 | Marur et al. | |
| 2013/0134739 A1 | 5/2013 | Harris et al. | |
| 2013/0161932 A1 | 6/2013 | Murray | |
| 2013/0241218 A1 | 9/2013 | Tsuchida et al. | |
| 2014/0207340 A1 | 7/2014 | Kunsch et al. | |
| 2014/0375081 A1 | 12/2014 | Kuriyama et al. | |
| 2015/0158442 A1 | 6/2015 | Yun et al. | |
| 2015/0175093 A1 | 6/2015 | Vaughn, Jr. | |
| 2015/0307045 A1 | 10/2015 | Matecki et al. | |
| 2015/0367798 A1 | 12/2015 | Bobba | |
| 2016/0121826 A1 | 5/2016 | Terada et al. | |
| 2016/0280163 A1 | 9/2016 | Matecki et al. | |
| 2017/0028950 A1 | 2/2017 | Keller et al. | |
| 2017/0106429 A1 | 4/2017 | Nakanishi et al. | |
| 2017/0253202 A1 | 9/2017 | Holderried et al. | |
| 2017/0274848 A1 | 9/2017 | Renegar | |
| 2017/0327065 A1 | 11/2017 | So et al. | |
| 2018/0022397 A1 | 1/2018 | Richardson et al. | |
| 2018/0222416 A1 | 8/2018 | Jadhav et al. | |
| 2019/0152413 A1 | 5/2019 | Renegar | |
| 2019/0308574 A1 | 10/2019 | Renegar | |
| 2020/0101912 A1 * | 4/2020 | Renegar | B60R 13/0861 |
| 2020/0377045 A1 | 12/2020 | Renegar | |

FOREIGN PATENT DOCUMENTS

| | | |
|---|---|---|
| DE | 10 2009 035778 A1 | 3/2010 |
| EP | 1 459 941 A1 | 9/2004 |
| EP | 1 464 547 A1 | 10/2004 |
| JP | S50-134595 U | 11/1975 |
| JP | H01-063479 A | 3/1989 |
| JP | H05-238418 A | 9/1993 |
| JP | H11-255049 A | 9/1999 |
| JP | 2000-264255 A | 9/2000 |
| JP | 2006-248284 A | 9/2006 |

OTHER PUBLICATIONS

Invitation to Pay Additional Fees for Application No. PCT/US2015/062366 dated Feb. 22, 2016.

International Search Report and Written Opinion for Application No. PCT/US2015/062366 dated May 6, 2016.

International Preliminary Report on Patentability for International Application No. PCT/US2015/062366, dated Jun. 8, 2017.

Extended European Search Report for European Application No. 15863079.8, dated Apr. 6, 2018.

[No Author Listed] CYMAT: Aluminum Foam Technology Applied to Automotive Design. 10 pages.

U.S. Appl. No. 16/094,988, filed Oct. 19, 2018, Renegar.

U.S. Appl. No. 16/386,071, filed Apr. 16, 2019, Renegar.

PCT/US2015/062366, Feb. 22, 2015, Invitation to Pay Additional Fees.

PCT/US2015/062366, May 6, 2016, International Search Report and Written Opinion.

PCT/US2015/062366, Jun. 8, 2017, International Preliminary Report on Patentability.

EP15863079.8, Apr. 6, 2018, Extended European Search Repor.

* cited by examiner

UNIFORM DECELERATION UNIT

CROSS-REFERENCE TO RELATED APPLICATIONS

This application is a continuation of and claims priority under 35 U.S.C. § 120 to U.S. application Ser. No. 15/529,017, filed May 23, 2017 and entitled "UNIFORM DECELERATION UNIT." U.S. application Ser. No. 15/529,017 is a national stage filing under 35 U.S.C. § 371 of International Application No. PCT/US2015/062366, filed Nov. 24, 2015, which claims the benefit under 35 U.S.C. § 119(e) to U.S. Provisional Application Ser. No. 62/083,403, entitled "UNIFORM DECELERATION UNIT FOR FRONTAL IMPACTS" and filed Nov. 24, 2014. The entirety of each of the documents listed above is herein incorporated by reference.

FIELD

The disclosed embodiments relate generally to automobiles and more particularly to safety systems arranged to improve the performance of an automobile in frontal, rear and side crashes.

BACKGROUND

Automobile accidents are an unfortunate reality in the world today. Every year tens of thousands of accidents occur in the United States alone. These accidents at minimum cause a financial strain on the automobile's owner and insurance companies and in worst case scenarios result in the fatality of the driver and/or other occupants of the vehicle. In 2012 alone, there were over 33,561 auto related deaths in the US. In recent decades the automotive industry has seen great advances in safety with innovations such as frontal air bags, side curtain airbags, electronic crash avoidance systems, and structural crumple zones to name a few. Still with the safety innovations we have today, there is demand to further improve the safety of automobiles.

With regard to crash situations where the impact is directed to the outer 25% of vehicles, such as in front impact crashes, automakers have resorted to two main strategies for improving their vehicles performance (e.g., in both the IIHS Small Overlap Front Impact Test and in real world accidents). These strategies include: 1) adding structure to the front corners of the vehicle between the front bumper and the panel at the aft side of the wheel well, and 2) designing structural members, such as the wheel and lower control arm, to fracture at a given load while flexing at loads of lesser energy. Such known strategies do not provide a satisfactory solution in all aspects.

SUMMARY

According to one aspect, a safety system for improving an automobile's performance in real world and/or simulated crashes (e.g., for the IIHS Small Overlap Front Impact test) are disclosed. In some embodiments, the system, also referred to as a Uniform Deceleration Unit ("UDU"), dissipates the energy arising from a frontal impact through the UDU structure and corresponding wheel and tire assembly, and away from the lower dash panel and vehicle occupants. The UDU may be tailored to virtually every make and model of car, truck, van or sport utility vehicle, both new and existing.

According to one embodiment, a device for improving the safety of an automobile in a crash is disclosed. The device includes first and second crash pads and a connection beam disposed between the first and second crash pads. The device absorbs and dissipates energy by converting kinetic energy into strain energy. The device provides for an economical and functional methodology to improve crash performance of current and future automobiles in frontal crash scenarios, as well as in side and rear crash scenarios. The result is improved safety in a crash. For example, the efficient design and low weight of the UDU may allow for a negligible impact on the fuel economy of the vehicle, while delivering a significant improvement on safety. Although originally designed for frontal small overlap impact accidents, the UDU may also improve the performance of most if not all frontal impact situations, as well as in side and rear crashes. The device may be comprised of two crash pads and a connection beam. Either the separate components or an assembly of the crash pads and connection beam may be affixed to an automobile. During a crash, the device will absorb and dissipate energy by converting a significant portion of the kinetic energy of the automobile into strain energy. Strain energy may be in the form of both elastic and plastic deformation of the crash pads and connection beam, but may also induce a cooperative effect wherein deformation of other structural members participates in dissipating energy.

According to another embodiment, a system for improving the safety of an automobile in a crash is disclosed. The system includes first and second crash pads and a connection beam disposed between the first and second crash pads. The assembly of crash pads and connection beam may be affixed to an automobile, for example in one of a front wheel well, a rear wheel well, or a side door. During a crash, the device will absorb and dissipate energy by converting a significant portion of the kinetic energy of the automobile into strain energy.

According to another embodiment, a method of improving the safety of an automobile in a crash is disclosed. The method involves two or more crash pads and a connection beam affixed to an automobile. During a crash, the method results in absorption and dissipation of energy by converting a significant portion of the kinetic energy of the automobile into strain energy.

According to another embodiment, a method of improving the safety of an automobile in a crash is disclosed. The method involves two or more crash pads and a connection beam affixed to an automobile. At least one of the crash pads is formed of a layer of cellular material that is low density and high strength. The cellular material may be covered with a skin layer that has high tensile strength. Optionally, such a skin layer is applied to both sides of the cellular material to add structural integrity and to protect the cellular material against penetration and accumulation by foreign matter. During a crash, the method results in absorption and dissipation of energy by converting a significant portion of the kinetic energy of the automobile into strain energy.

According to yet another embodiment, a method of improving the safety of an automobile in a crash is disclosed. The method involves two or more crash pads and a connection beam affixed to an automobile. At least one of the components, comprised of two crash pads and a connection beam, is formed as a rib and web design. By way of example but not limited to this case, with such a rib and web design the primary load path ribs may span the axial length of the component.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE VARIOUS EMBODIMENTS

Figure 1:
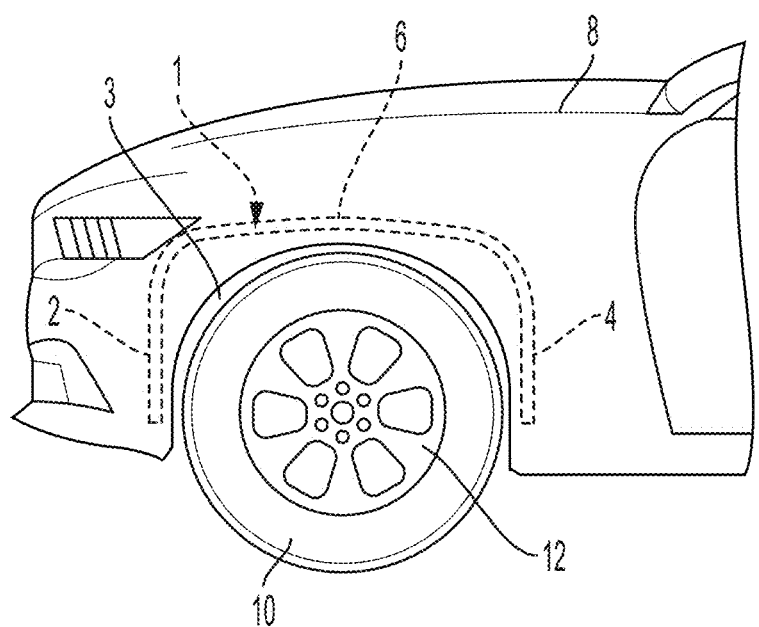
FIG. 1 depicts a Uniform Deceleration Unit installed in the wheel well of an automobile according to one embodiment.

Automobile accidents are an unfortunate reality in the world today. These accidents at minimum cause a financial strain on the automobile's owner and insurance companies, and in worst case scenarios result in the fatality of the driver and/or other occupants of the vehicle. In recent decades the automotive industry has seen great advances in safety with innovations such as frontal air bags, side curtain airbags, electronic crash avoidance systems, and structural crumple zones to name a few. Still, with the safety innovations we have today, there is demand to further improve the safety of automobiles. One recognized need is to improve vehicle design to further minimize injury to occupants resulting from a frontal crash.

Typically, automobiles do not have significant structural components in the region receiving the impact in small overlap frontal crashes. As will be appreciated, without structural components to absorb and/or transmit the energy arising from impact, the energy can be directed into the wheel and suspension components, which can be forced through the wheel well and into the driver compartment. As will be further appreciated, current tests (e.g., the Small or Narrow Overlap Front Impact Test by the Insurance Institution for Highway Safety ("IIHS")) are particularly interested in the intrusion of vehicular objects (such as suspension components, wheel, and structural members), caused by the impact, into the passenger compartment, specifically the lower dash panel which is located by the driver's feet, and fire wall.

To date, automakers have resorted to two main strategies to improving their vehicles performance in both simulated and real world accidents. These strategies include: 1) adding structure to the front corners of the vehicle between the front bumper and the panel at the aft side of the wheel well, and 2) design structural members, such as the wheel and lower control arm, to fracture at a given load while flexing at loads of lesser energy. Such known strategies, however, do not provide a satisfactory solution in all aspects.

For the first strategy, in the case of frontal impact crashes, the addition of structural components to the front of the vehicle may be designed to allow the energy arising from impact to be dissipated and/or transferred to other areas of the automobile, without being directed or transferred to the occupants. While the addition of structure to the front corners of the automobile may be effective, such additional structures also may add a significant amount of mass to the automobile. As will be appreciated, given the increased demand for fuel economy, from both the consumer and the government, any increase in mass to the automobile will have a significant negative impact on the marketplace demand for the vehicle. However, reduced fuel economy, coupled with the added manufacturing cost to create new structural members and the associated costs of re-designing the automobiles to add these new structural members, make this approach less than appealing to automakers.

In some instances, automakers have lengthened their vehicles by several inches to accommodate the structural components needed to pass the IIHS testing, which adds significant cost to the manufacturer. Since such added costs are passed along to the consumer, there is a need for an alternative solution that improves safety while minimizing added costs and minimizing added mass.

For the second strategy, crash performance from small overlap frontal impacts is done through designing structural members, such as lower control arms and wheels, to fracture at a specified load upon impact. Without wishing to be bound by theory, this may be accomplished by designing the members to flex, thus absorbing some of the impact energy, and then eventually break or fracture at a prescribed load. As will be appreciated, this may allow a portion of the impact energy to be dissipated and directed away from the lower dash panel at the feet of the driver and other areas of the driver/passenger compartment.

The second strategy also requires evaluation of the materials in which the fracturable components are constructed. For example, if an automotive designer wishes to use the wheel as a fracturable component, then the wheel cannot be made of steel, which is very ductile and otherwise might not fracture under high loads, as desired. Again, inclusion of fracturable components may lead to significant added costs, with much of this cost passed along to the consumer. The use of components designed to fracture under a given set of load conditions also greatly increases design complexity, and it can limit the styling flexibility of wheels. Thus, a solution to improve the performance of an automobile in small overlap frontal impacts is needed to improve the vehicle performance, both in real world and simulated crash situations.

Applicant has realized that a commercially feasible solution to improve the performance of an automobile in a crash situation, particularly, but not limited, to a small or narrow overlap frontal impact, is needed. In some embodiments, the design requirement is that the solution be constructed of lightweight materials, and be capable of effectively absorbing energy arising from an impact and dissipating the energy away from the lower dash panel and occupants of the vehicle. A solution which could be retro-fitted to older vehicles to improve their performance in crash situations is also needed.

Currently, as IIHS is placing an emphasis on frontal impact crashes, there is a general need to improve the safety of vehicle occupants. As will be appreciated, it is particularly difficult to design structures that can cost-effectively protect occupants against side crashes, since there is so little space between the exterior of a side door, for example, and the occupant. In addition, there is a need to provide cost-effective protection for occupants from rear crashes. Overall, there is a need for new structures that can be added to vehicles to absorb energy arising from impacts and dissipate the crash energy with minimal deformation Applicant has realized that by improving performance of a vehicle in a frontal crash, as well as side and rear crashes, various advantages may be realized. As such, embodiments described herein include a safety device that absorbs energy arising from an impact and dissipates the crash energy with minimal deformation. In some embodiments, the device includes first and second crash pads and a connecting beam that interact with the vehicle (e.g., the wheel assembly in the wheel well). In the case of frontal crashes, the safety device may minimize deformation of the lower dash and inner driver compartment of the vehicle. The safety device also may minimize deformation of the side door in the case of side crashes, and the rear occupant compartment in the case or rear crashes. The safety device also may improve the safety of vehicle occupants by absorbing impact energy in such a way as to help minimize the overall crash forces generated.

In some embodiments, the performance of a vehicle is improved in a small or narrow overlap frontal crash. In either frontal or small overlap frontal crashes, performance improvement may result from absorption of the impact energy through plastic deformation across a large portion of the width of the wheel well. With such energy absorption, the remaining energy acting on and causing deformation of the lower dash panel, firewall, and A-pillar may be reduced, as is the potential for intrusion into the vehicle occupant space and injury to the vehicle occupants. Overall, implementation of the disclosed embodiments leads to decreased injury to the vehicle occupants.

According to one aspect, the safety device includes a Uniform Deceleration Unit ("UDU") that can be incorporated into new and existing vehicles, with little to no modification to the vehicle. In some embodiments, the UDU includes first and second crash pads and a connecting beam. In one embodiment, the UDU is mounted in the wheel well of a vehicle. In such an embodiment, in the event of a frontal crash or a rear crash, the UDU interacts with the tire and wheel assembly to maximize energy absorption and dissipation. It will be understood that the disclosed UDU may be applied in either or both of front and rear wheel wells.

It will be further understood by those skilled in the arts that the UDU may be fitted into the wheel well of virtually any vehicle and may absorb a significant portion of the total crash energy of that vehicle. In some embodiments, detailed geometries and materials of construction of the UDU can be tuned to increase or reduce the amount of crash energy absorbed, depending on the crush strength of other structural members to which the UDU is primarily attached. Depending on UDU design, the energy absorption can range from minimum of 10% of the total crash energy of the vehicle to approaching 100% of the total crash energy. For purposes herein, structural members may include items such as headlight frame, front bumper, fender, lower dash panel, A-pillar, rocker, steering wheel, amongst others.

Turning now to the figures, FIG. 1 illustrates a UDU 1 installed in a wheel well 3 of a typical automobile 8. In some embodiments, a UDU 1 may be used with a passenger car, as is shown. As will be appreciated by one of ordinarily skilled in the art, a UDU 1 may be used with all types of automobiles, including but not limited to: cars, trucks, sport utility vehicles, vans, busses, motorcycles, and crossover vehicles.

Figure 2:
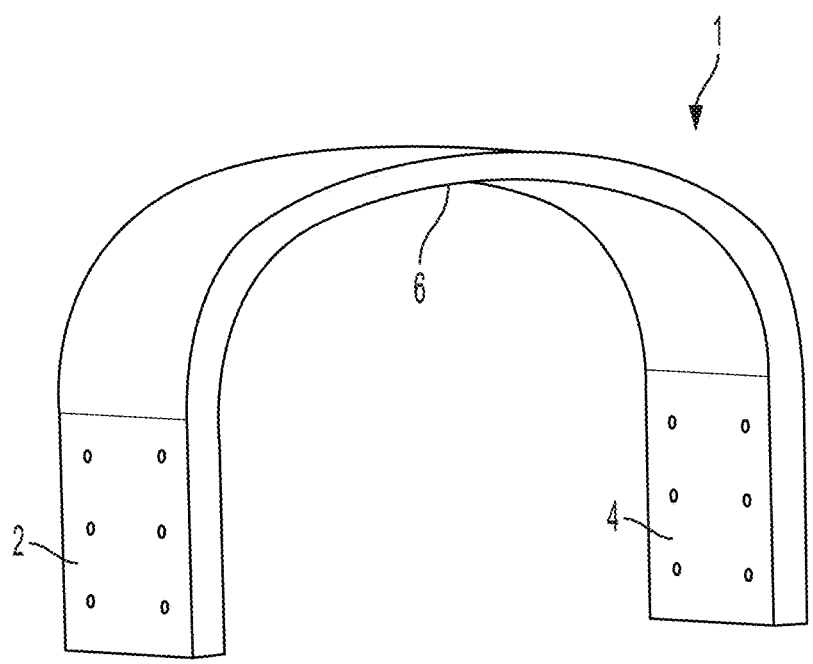
FIG. 2 is an illustration of a Uniform Deceleration Unit according to one embodiment.

As shown in FIG. 2, a UDU 1 may be a light-weight structure which fits into one or more wheel wells 3 of the automobile. For example, a UDU 1 may be installed in a front wheel well 3, a rear wheel well 3, or in both front and rear wheel wells 3. Mounting holes 5 may be used to attach UDU 1 to the automobile.

According to one aspect, UDU includes an inverted "U"-shape, although other suitable shapes may be used. As shown in FIG. 2, a UDU 1 includes a forward crash pad 2, a connection beam 6, and a rear or aft crash pad 4. In some embodiments, a UDU 1 also may include multiple forward crash pads 2 and/or multiple aft crash pads 4, that are joined to a connection beam 6. As will be appreciated, these components may be referred to as a UDU 1. As will be further appreciated, a UDU 1 also may include other components.

Although the connection beam 6 is shown as a single piece connecting the forward and aft crash pads, as will be appreciated, in other embodiments, the connection beam 6 may include one or more sections.

In some embodiments, the components of a UDU 1 are not distinguishable from one another. For example, a UDU 1 may include to a monolithic structure, wherein the forward crash pad 2, the aft crash pad 4, and the connection beam 6 are formed as a single structure. Furthermore, the individual components comprising forward crash pad 2, the aft crash pad 4, and connection beam 6 may be straight or may curved up, down, left, or right. Indeed, the assembly of forward crash pad 2, the aft crash pad 4, and connection beam 6 may be comprised of straight segments, or may curved up, down, left, or right.

As will be appreciated by one skilled in the art, the individual components of a UDU may be fabricated from a wide variety of materials, using a wide variety of shaping methods, and joined into an assembly using a wide variety of generally available methods. Exemplary materials, though not limiting the scope of this disclosure, include alloys of aluminum known for having combination of high strength, low density, and relatively low cost; but also carbon fiber composites, polymer composites, metal matrix composites, layered composites including steel, and high-strength plastics. For example, crash pads may be constructed of a material having a mass per unit volume less than about 3,000 kg/m$^3$; yield strength of at least 180 MPa; and Young's modulus of at least 500 MPa. Cellular materials having porosity substantially greater than zero may be of particular interest for combination of high strength and low density. For example, crash pads may be constructed of a cellular material having a mass per unit volume less than about 1,000 kg/m$^3$. Exemplary shaping methods, though again not limiting the scope of the disclosure, include stamping, forging, casting, machining, and printing. Joining methods may include simple mechanical joining including crimping, screws or brads, ordinary welding, friction stir welding, addition of high-strength adhesives, or any combination of the above. As will be appreciated, while each component of the UDU may be made of the same material and/or by the same manufacturing technique, the components also may be made of different materials and/or by different manufacturing techniques.

Turning back to FIG. 2, an illustration of a UDU 1 having the forward crash pad 2, the connection beam 6, and the aft crash pad 4. As is shown, a UDU 1 may include a single or multiple layers of a cellular material that is designed to absorb and deflect the energy from an impact arising from a frontal impact, or more particularly from a small overlap impact.

Figure 3:
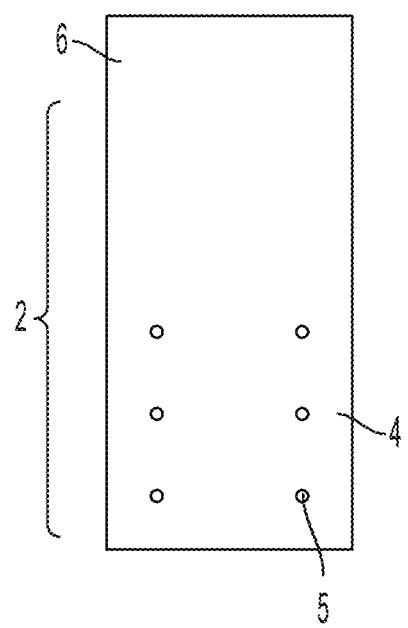
FIG. 3 is a front view of a Uniform Deceleration Unit of FIG. 2.

In some embodiments, as shown in FIGS. 2 and 3 (FIG. 3 being a front view of the forward crash pad 2), a UDU 1 has a height H of about 0.2-1.0 meter and a length L of about 0.5-2.0 meter and a thickness T of about 5-200 mm. As will be appreciated, a UDU 1 also may have other suitable dimensions in other embodiments. As shown in FIG. 3, the forward crash pad 2 may have a thickness T1 of about 5-200 mm and a length L1 of about 0.1-1.0 meter. As will be further appreciated, the aft crash pad 4 may be the same size as the forward crash pad 2 shown in this figure, although the crash pads also may be different sizes. As will be further appreciated, although the front and aft crash pads are shown as being the same shape in these figures, the front and aft crash pads also may include different shapes. Mounting holes 5 may be used to attach UDU 1 to the automobile.

Without wishing to be bound by theory, in a typical frontal crash not having the benefit of UDU 1, the crash impact is first absorbed by the vehicle's existing structure, such as by front bumper, headlight, and/or wheel well materials. Next, the force of impact propels these components rearward through the wheel well 3 of the vehicle and into other components, such as through an inflated tire 10, a wheel assembly 12, a lower control arm (not shown), and a brake assembly (not shown). The result is that some of the automobile components are forced into a lower dash panel, an A-pillar and a steering wheel, penetrating the passenger compartment and potentially causing injury to the occupants.

Figure 4:
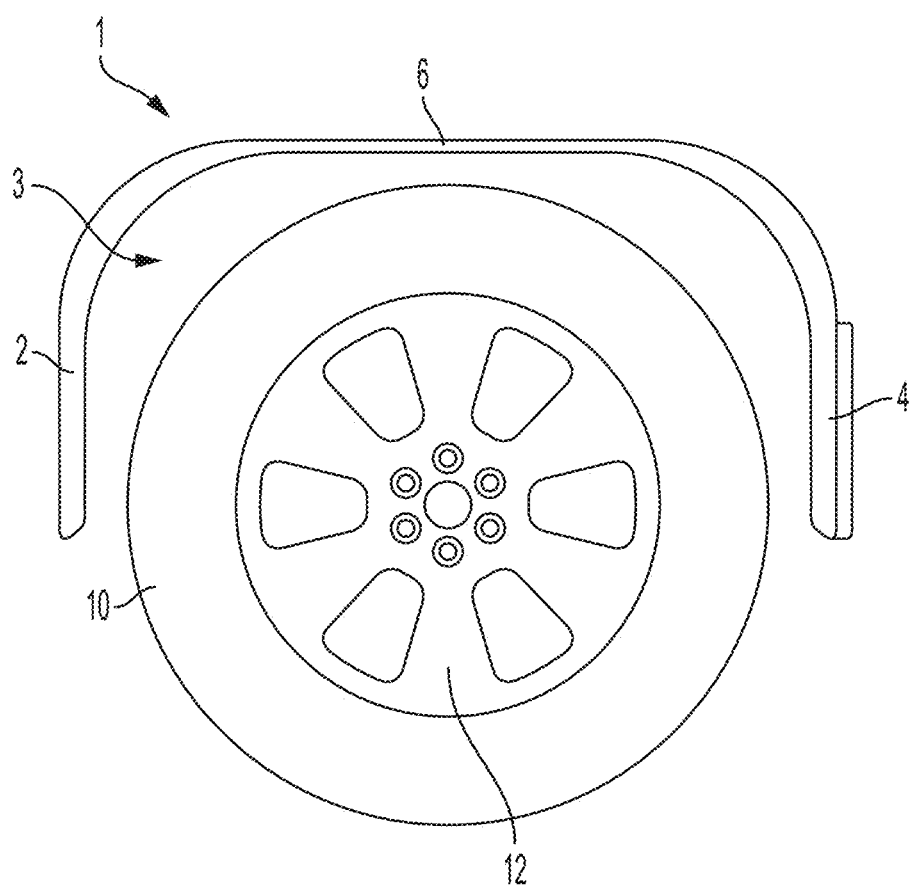
FIG. 4 is a schematic representation of a pre-impact state of a Uniform Deceleration Unit mounted to a vehicle's wheel assembly, for use during a frontal impact crash.

As illustrated in FIGS. 4-7, in the event of a crash of an automobile having a UDU 1, a UDU 1 interacts with the tire and wheel assembly to maximize energy absorption and dissipation and improve vehicle crash performance. As shown in FIG. 4, in a normal, pre-impact state, a UDU 1 is mounted in the vehicle's wheel assembly such that a UDU 1 extends around a top half of the wheel. As will be appreciated, a UDU 1 works interactively with the existing structural components of the vehicle wheel well 3, as shown in FIG. 1.

Figure 5:
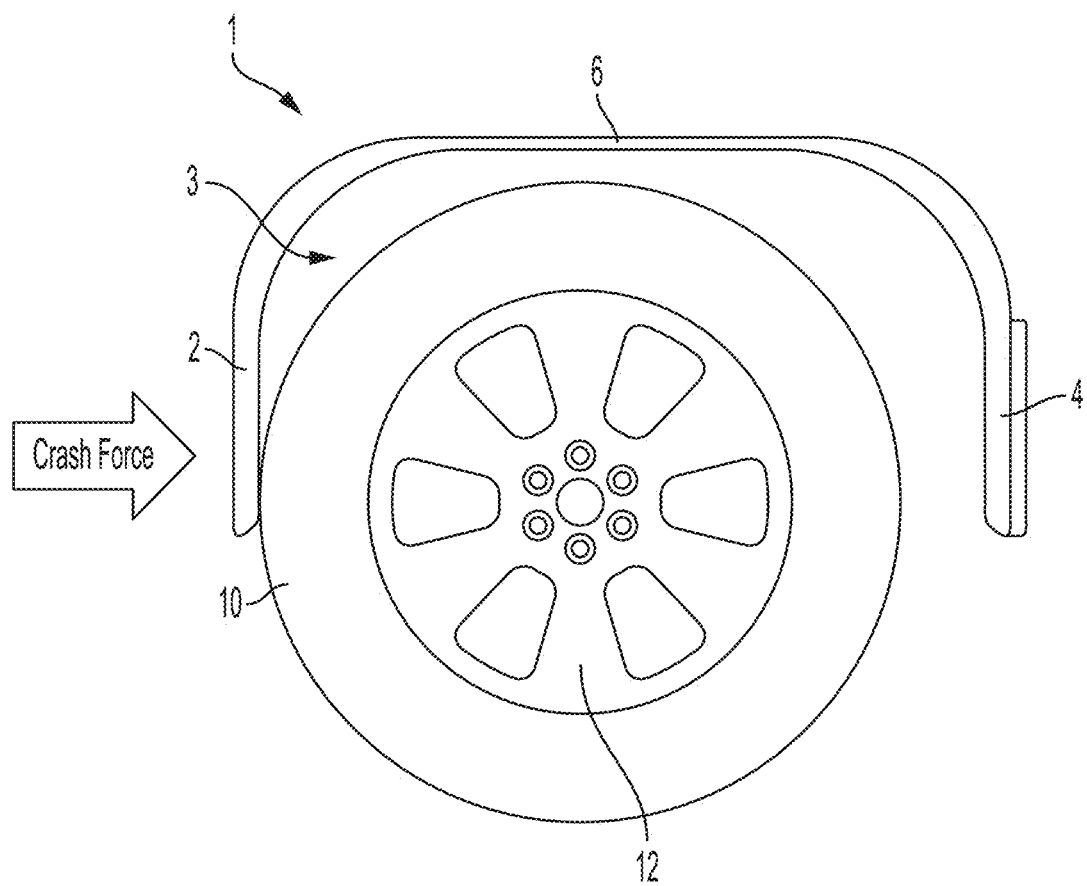
FIG. 5 is a schematic representation of a Uniform Deceleration Unit of FIG. 4 during the initial stages of a frontal impact.

In embodiments where a UDU is installed in the automobile, the initial crash impact is first absorbed by the existing vehicle components (i.e. headlight frame, front bumper, and fender), similar to frontal impacts where the UDU is not in place. However, as illustrated in FIG. 5, with a UDU 1 in place, once the impact reaches the forward crash pad 2, the forward crash pad makes contact with the inflated tire to and wheel assembly 12. In such a situation, as the force acting on the forward crash pad 2 and inflated tire 10 increases, the inflated tire 10 will de-bead and lose air pressure.

Figure 6:
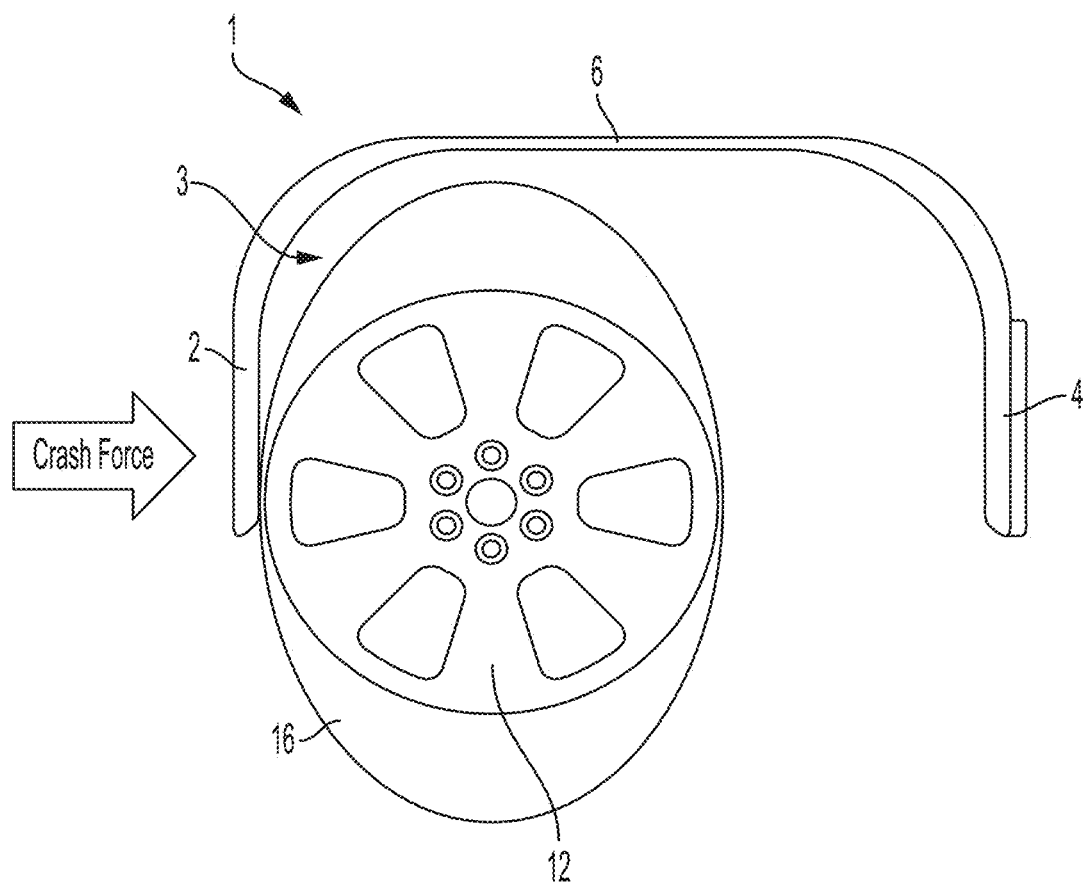
FIG. 6 is a schematic representation of a Uniform Deceleration Unit of FIG. 4 during a frontal impact in which a crash force has caused a front crash pad to significantly deform the tire.

As shown in FIG. 6, once air pressure is lost from inflated tire to, the forward crash pad 2 will apply a load to the wheel assembly 12. In such a situation, as the load continues to increase, both the forward crash pad 2 and the wheel assembly 12 will continue to deform.

Figure 7:
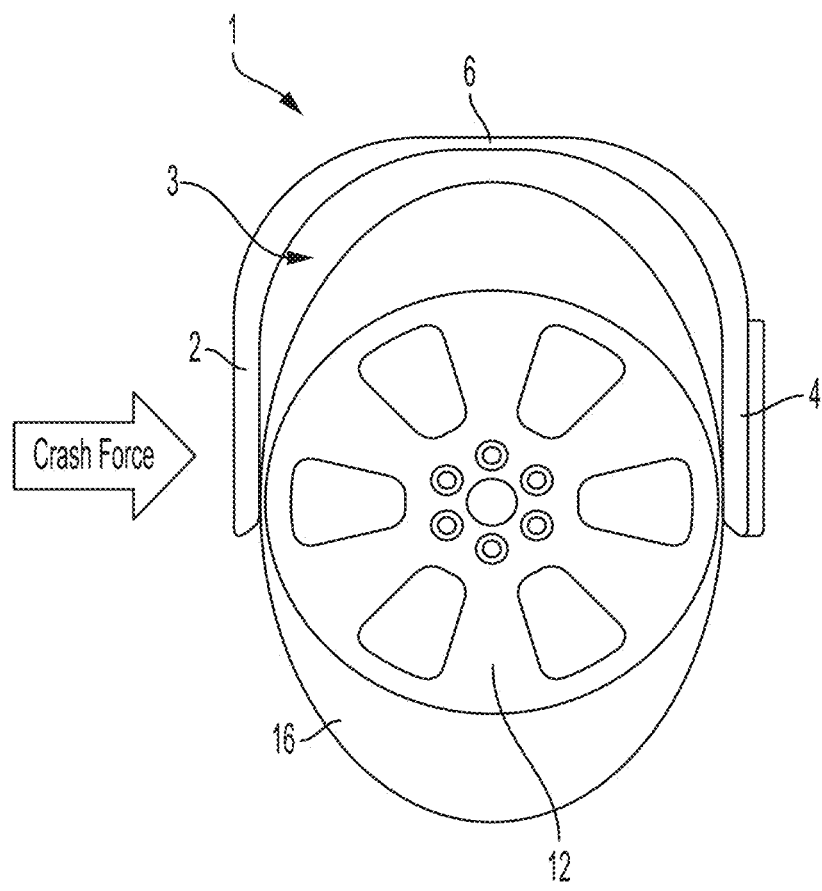
FIG. 7 is a schematic representation of a Uniform Deceleration Unit of FIG. 4 after the impact has caused a vehicle tire to de-bead and a wheel assembly to contact the rear crash pad.

As illustrated in FIG. 7, once a threshold amount of deformation has been reached, the connection beam 6 will begin to plastically deform. For example, threshold amount of deformation might be the point at which the front crash pad makes contact with wheel assembly 12. In this situation, the forward crash pad 2 pushes the wheel assembly 12 and deflated tire 16 into the aft crash pad 4. In some embodiments, as the forward crash pad 2 and the aft crash pad 4 plastically deform, energy generated by the crash that passed into the wheel well 3 region of the vehicle is absorbed and dissipated.

As will be appreciated, due to variations in design, the wheel assembly 12 may or may not fracture at the point where the aft crash pad 4 is significantly deformed. However, as will be further appreciated, at this fracture point, much of the energy generated by the crash will have already been absorbed by both the existing structure of vehicle and a UDU 1. As such, intrusion into the lower dash panel and occupant space may be limited or even prevented.

According to one aspect, the UDU has an inverted "U"-shape. Such an inverted "U"-shape may allow for the installation of the UDU into the wheel well 3 of the automobile without significant design alterations to the automobile. Therefore, the device may be added to new vehicles (e.g., vehicles that are currently in production) or to older vehicles, without requiring costly design alterations.

As will be appreciated, the installation methodology is consistent with the energy absorption properties of the UDU. For example, the placement of a UDU 1 over the wheel assembly 12, as shown in FIGS. 1 and 4, may allow the forward crash pad 2 to keep the inflated tire to and wheel assembly 12 in a longitudinal attitude as the inflated tire to compresses and deflates during a crash. In some embodiments, the connection beam 6 will deform with the forward crash pad 2 in contact with the wheel assembly 12 and deflated tire 16. As a crash proceeds, the connection beam 6 may first deform elastically and then deform plastically. Such deformation may occur while the forward crash pad 2 remains in contact with the deflated tire 16 and wheel assembly 12. As will be appreciated, the constant contact between the forward crash pad 2 and deflated tire 16 and wheel assembly 12 may act to prevent the wheel assembly 12 from rotating out of the wheel well 3 during the crash.

In some embodiments, preventing such rotation may have the effect of diminishing the amount of energy absorbed by the wheel assembly 12. As will be appreciated, such rotation of the wheel assembly 12 is a common problem with the performance of conventional designs in a crash situation. In fact, the wheel assembly 12 is typically designed to be fracturable as a means to further dissipate energy, but such designs do not achieve the desired effect when the wheel assembly 12 rotates. Or, if the design is intended to rotate the wheel out of the wheel well 3 during a crash in order to either engage the A-pillar or cut off the load path inside the wheel well 3, the tactic has limitations that depend on the complex kinematics of the crash.

In contrast, with the UDU 1, the forward crash pad 2 may maintain contact with the deflated tire 16 and wheel assembly 12, and when the connection beam 6 is deformed, the wheel assembly 12 may be pinned against the aft crash pad 4. In such a situation, the aft crash pad 4 may plastically deform until wheel assembly 12 fractures. As will be appreciated, when the aft crash pad 4 has deformed and the wheel assembly has possibly fractured, further force acting on the lower dash panel, A-pillar, and occupants will be minimized.

In some embodiments, with the UDU, the majority of the energy generated by the crash energy will be dissipated by the combination of components included in a generic automobile 8 and components in the UDU.

In some embodiments, mounting of a UDU 1 to the vehicle can also be accomplished through mounting holes 5 (see FIGS. 2 and 3) in the frontal crash pad 2, aft crash pad 4, and/or connection beam 6. Mounting brackets may optionally be located on each of these components, and aligned to the wheel well 3, for the case of a frontal impact crash. The UDU may be fixed to the vehicle through any number of mechanical, physical, or chemical means, including but not limited to screws, bolts, rivets, glue, high strength adhesive, welding, or incorporation into an existing structural component of the vehicle, further including but not limited to shock tower, fender, bumper, or hood. In some embodiments, the forward crash pad 2 and the aft crash pad 4 are constructed of a very low-density cellular material such as metallic foam or honey-comb material. The connection beam 6, connecting the forward crash pad 2 and aft crash pad 4, may optionally be constructed of the same low-density cellular material as the crash pads. In one embodiment, the connection beam 6 may be constructed of a high strength material having a low Young's modulus, allowing it to undergo significant plastic deformation to absorb significant energy without breaking or fracturing. The connection beam 6 may be straight or may be curved up, down, left, or right.

The forward crash pad 2, aft crash pad 4 and connection beam 6, may be either constructed separately and then assembled, or constructed as a single monolithic structure. As will be appreciated, the cellular and or honey-comb material may have sufficient strength to absorb significant energy through plastic deformation without breaking during an impact. In some embodiments, the forward crash pad 2, aft crash pad 4 and connection beam 6, can be constructed by extrusion, casting, forging, or other metal forming techniques.

Figure 8:
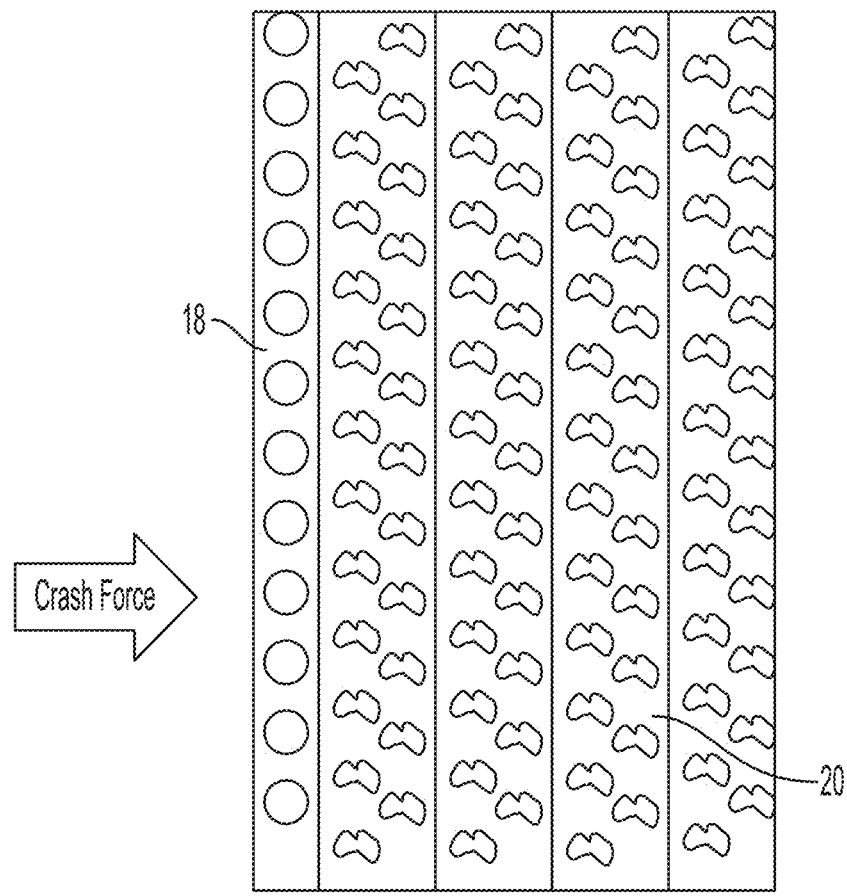
FIG. 8 is a cross-sectional side view of a frontal crash pad.

FIG. 8 shows an energy absorbing layer 20 of the forward crash pad 2 and aft crash pad 4. In one embodiment, the energy absorbing layer 20 may be covered with a high-tensile-strength layer 18 to help facilitate the spreading of the crash force over a larger area of the crash pad. This high-tensile-strength layer 18 can optionally be applied to either the inner or outer surface individually, or to both the inner and outer surfaces of the subject crash pad. In single-sided applications, the high-tensile strength layer 18 may be applied to the crash pad surface which, during a frontal or rear impact, may contact the inflated tire 10 and wheel assembly 12. High-tensile-strength layer 18 is intended to spread the crash load over a large area of the crash pad during an impact.

Figure 9A:
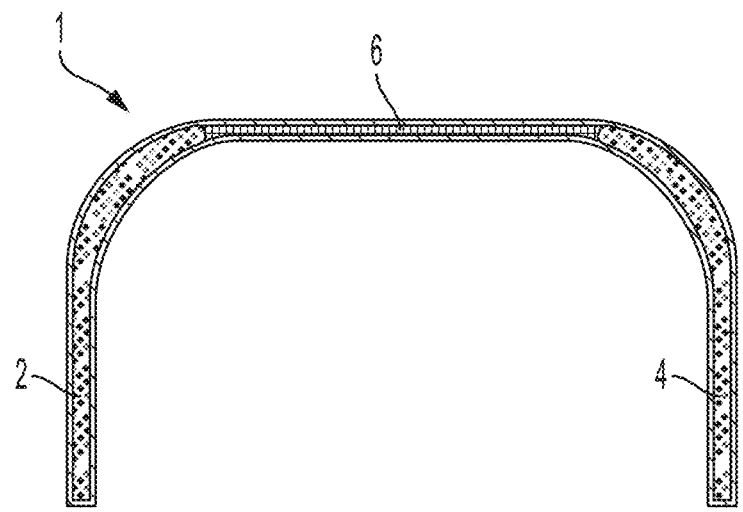
FIG. 9A is a Uniform Deceleration Unit having a very low density cellular material such as a foam or a honeycomb material sandwiched between two skin layers in the crash pads, according to an embodiment.
Figure 9B:
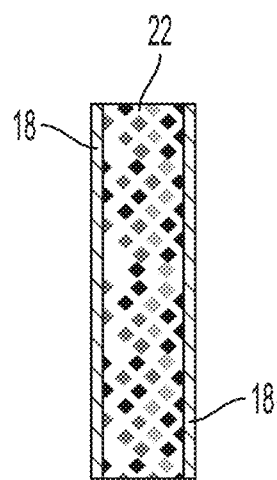
FIG. 9B is an enlarged view of a portion of a Uniform Deceleration Unit of FIG. 9A.

As shown in FIG. 9, another embodiment of the energy absorbing layer 20 may include a very low density cellular material sandwiched between two layers of high-tensile-strength materials 18. For example, crash pads may be constructed of cellular material, sometimes called metallic foam, having a mass per unit volume of less than about 1,000 kg/m$^3$ sandwiched between two skin layers that are attached to the metallic foam.

The low density cellular material 22 may be fabricated by casting, forging, or other metal forming techniques. Also, UDU 1 structure can be assembled from three distinct components, namely the frontal crash pad 2, the aft crash pad 4, along with the connection beam 6, each of which have been constructed from the aforementioned materials. This alternative structure may or may not be covered with high-tensile-strength layer 18 to help facilitate the spreading of the crash force over a larger area of the crash pad. Such high-tensile-strength layer 18 may or may not cover a single side, multiple sides, or all sides of the structure.

Figure 10A:
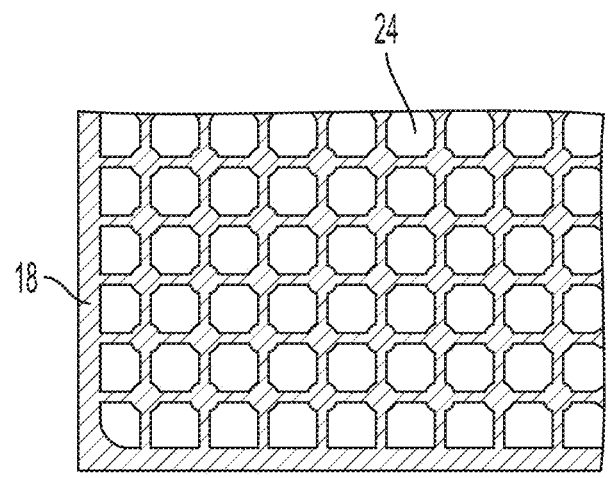
FIG. 10A depicts an enlarged view of a portion of a Uniform Deceleration Unit of FIG. 10B.
Figure 10B:
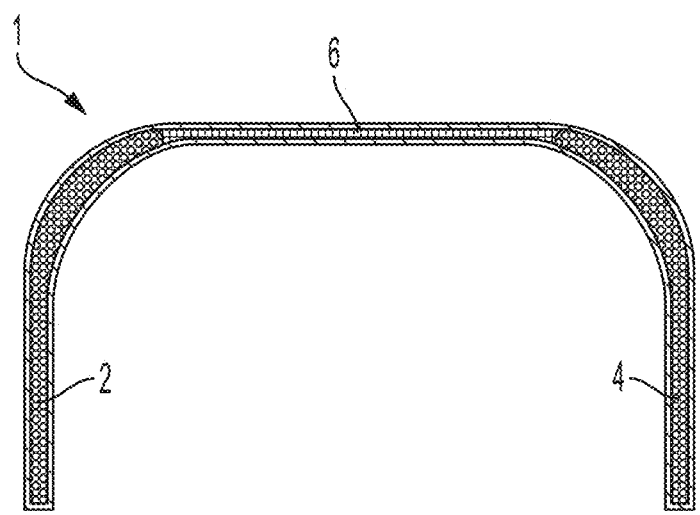
FIG. 10B depicts a Uniform Deceleration Unit with crash pads constructed of a matrix of thin walled ribs and webs joined together between two skin layers.

Referring to FIG. 10, another embodiment of a UDU 1 utilizes a matrix of thin-walled ribs and webs 24 formed from material that has properties of high ductility, high strength, and relatively low modulus in place of the cellular material serving as the primary energy absorption layer in the crash pads. The matrix may include thin-walled ribs, and webs 24 may be fabricated by casting, forging, or other metal forming techniques. Also, the frontal crash pad 2, the aft crash pad 4, along with connection beam 6, may be constructed from the aforementioned materials. This alternative structure may or may not be covered with high-tensile-strength layer 18 to help facilitate the spreading of the crash force over a larger area of the crash pad. Such high-tensile-strength layer 18 may or may not cover a single side, multiple sides, or all sides of the structure.

Figure 11A:
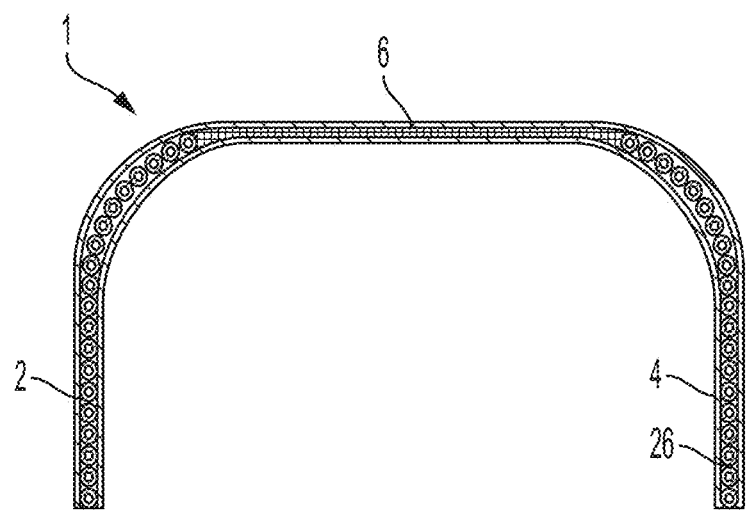
FIG. 11A depicts a Uniform Deceleration Unit with crash pads constructed of hollow tubes joined together between two skin layers with the tubes running transverse to the vehicle's fore-aft axis.
Figure 11B:
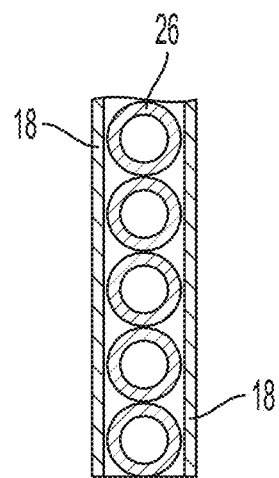
FIG. 11B is an enlarged view of a portion of a Uniform Deceleration Unit of FIG. 1A.

FIG. 11 illustrates another embodiment of a UDU 1 that includes forward and aft crash pads 2, 4 constructed with the an energy absorption layer constructed of a tube array 26, which is oriented transverse to the vehicle fore-aft axis. The tube array 26 can be either a single layer, double layer, or multiple layers, using a material or materials that have the properties of high ductility, high strength, and relatively low modulus. The thin-walled tubes comprising tube array 26 may have a cross sectional shape of circular, rectangular, or another closed geometric or organic shape. This configuration may be formed by a variety of methods including but not limited to extrusion, casting, forging, and other metal forming techniques. Tube array 26 may be generated as one continuous part or it may be formed from multiple discrete thin-walled tubes joined together. Tube array 26 can optionally be fabricated from a composite of engineered materials designed to give the desired properties of high ductility, high strength and relatively low modulus.

Figure 12A:
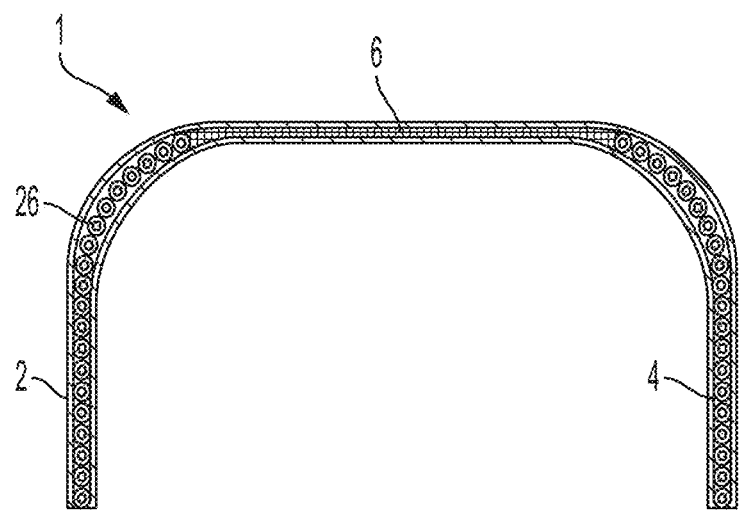
FIG. 12A depicts a Uniform Deceleration Unit with crash pads constructed of hollow tubes, running transverse to the fore-aft axis of the vehicle, joined together between two skin layers and filled with a viscous material.
Figure 12B:
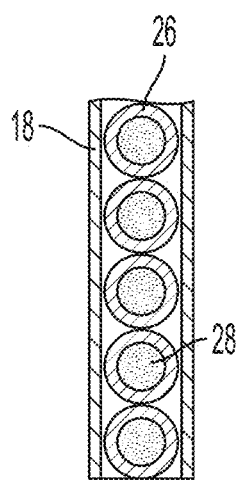
FIG. 12B is an enlarged view of a portion of a Uniform Deceleration Unit of FIG. 12A.

FIG. 12 is an illustration of yet another embodiment of a UDU 1, with the forward and aft crash pads 2, 4 constructed with the energy absorption layer having a tube array 26, which are oriented transverse to the vehicle fore-aft axis. In this embodiment, such thin-walled tubes comprising tube arrays 26 are filled with a viscous material 28. The thin-walled tubes comprising tube array 26 are constructed in such a way that viscous material 28 would be forced to follow a particular path upon application of external forces. At some point in the progression of a crash, viscous material 28 would be forced out of the tube through a restricted opening, thus absorbing crash energy in a hydraulic-like mechanism. The deformation of tube array 26 will absorb energy during a crash as well as the forced movement of viscous fluid 28. Tube arrays 26 can be either a single layer, double layer, or multiple layers, using a material or materials that have properties of high ductility, high strength, and relatively low modulus. The thin-walled tubes comprising tube array 26 can have a cross sectional shape of circular, rectangular, or another closed geometric or organic shape. This configuration may be formed by a variety of methods including but not limited to extrusion, casting, forging, and other metal forming techniques. Tube array 26 may be generated as one continuous part or it may be formed from multiple discrete thin-walled tubes joined together. Tube array 26 may also be fabricated from a composite of engineered materials designed to give the desired properties of high ductility, high strength and relatively low elastic modulus.

Figure 13A:
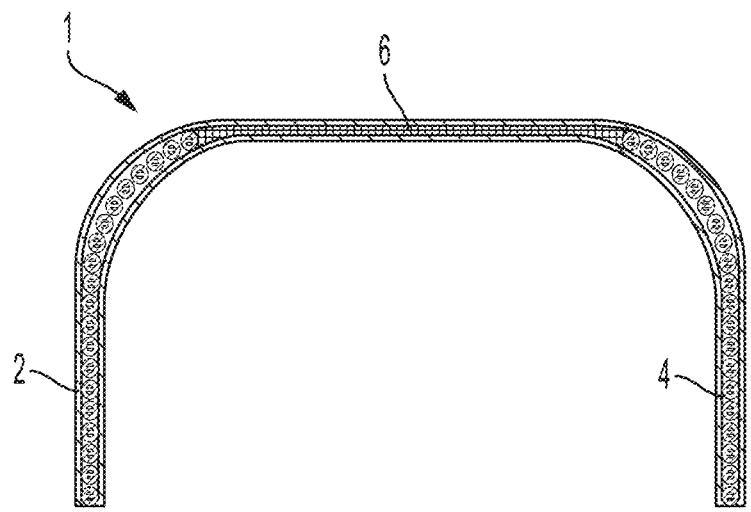
FIG. 13A depicts a Uniform Deceleration Unit with crash pads constructed of hollow tubes, running transverse to the fore-aft axis of the vehicle, joined together between two skin layers and filled with a slender column like structure or structures.
Figure 13B:
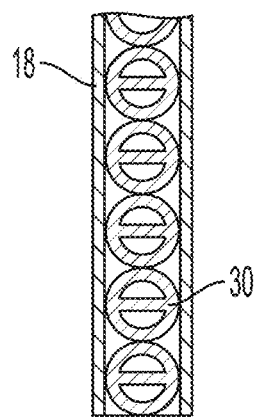
FIG. 13B is an enlarged view of a portion of a Uniform Deceleration Unit of FIG. 13A.

FIG. 13 illustrates another embodiment of a UDU 1 with forward and aft crash pads 2, 4 constructed with the energy absorption layer having a tube array 26, oriented transverse to the vehicle fore-aft axis. The tube array 26 may be either a single layer, double layer, or multiple layers, using a material or materials that have properties of high ductility, high strength, and relatively low modulus. The thin-walled tubes which comprise tube array 26 may have a cross sectional shape of circular, rectangular, or another closed geometric or organic shape. The tubes may be filled with slender column-like structures 30o. The slender column-like structures may be located inside the tubes and oriented perpendicular to the outer tubes and parallel with the fore-aft axis of the automobile. During the progression of a crash, the internal structure of the tubes may buckle as the tube array 26 is crushed. This configuration may be formed by a variety of methods including but not limited to extrusion, forging, casting, and other metal forming techniques. The tube array 26 may be generated as one continuous part or it may be formed from multiple discrete tubes joined together. The tube array 26 can also be fabricated from a composite of engineered materials designed to give the desired properties of high ductility, high strength and relatively low modulus.

Figure 14A:
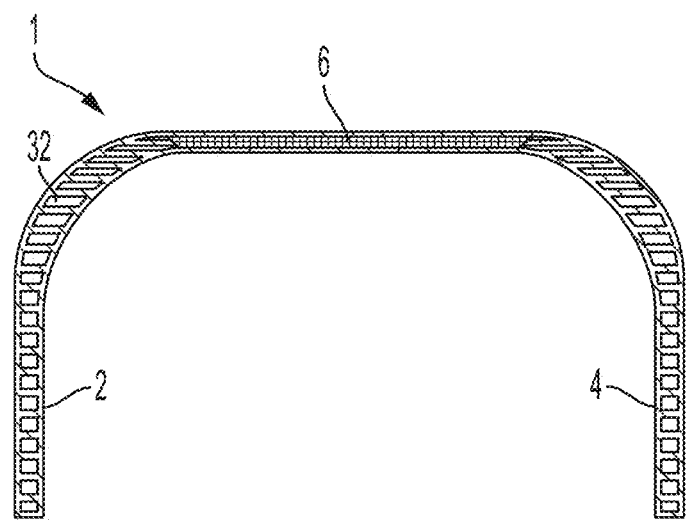
FIG. 14A depicts a Uniform Deceleration Unit with crash pads constructed of hollow tubes, running parallel to the fore-aft axis of the vehicle, joined together between two skin layers.
Figure 14B:
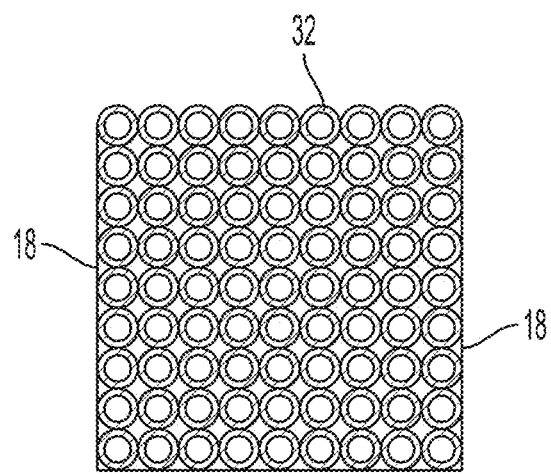
FIG. 14B is an enlarged view of a portion of a Uniform Deceleration Unit of FIG. 14A.

FIG. 14 illustrates another embodiment of a UDU 1 with forward and aft crash pads 2, 4 constructed with the energy absorption layer having a parallel tube array 32 oriented parallel to the vehicle fore-aft axis. The parallel tube array 32 can be either a single layer, double layer, or multiple layers, using a material or materials that have high ductility, high strength, and relatively low modulus. The thin-walled tubes which comprise tube array 32 may have a cross sectional shape of circular, rectangular, or another closed geometric or organic shape. Thin-walled tubes comprising tube array 32 may be sandwiched between layers of light weight, high strength material 18. This configuration may be formed by a variety of methods including but not limited to extrusion, forging, casting, and other metal forming techniques. The tube array 32 may be generated as one continuous part or it may be formed from multiple discrete thin-walled tubes joined together. Tube array 32 can also be fabricated from a composite of engineered materials designed to give the desired properties of high ductility, high strength and relatively low modulus.

Figure 15A:
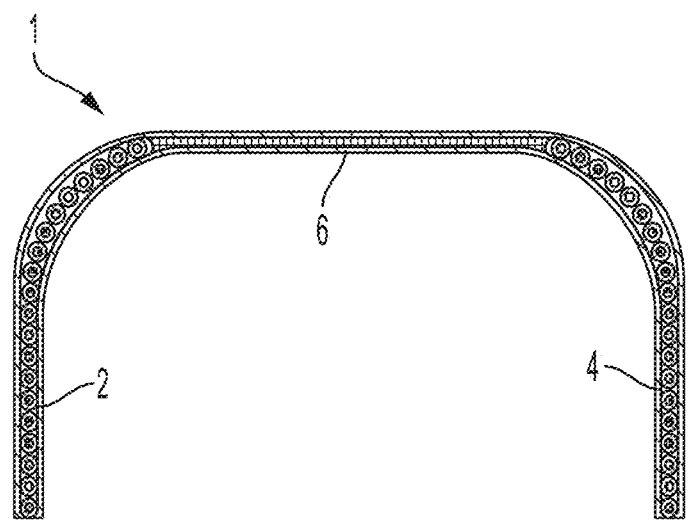
FIG. 15A depicts a Uniform Deceleration Unit with crash pads constructed of hollow tubes, running transverse to the fore-aft axis of the vehicle, joined together between two skin layers and filled with a very low density cellular material.
Figure 15B:
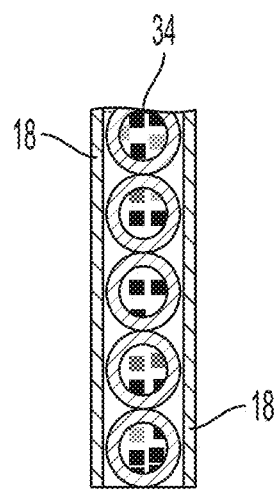
FIG. 15B is an enlarged view of a portion of a Uniform Deceleration Unit of FIG. 15A.

FIG. 15 illustrates another embodiment that utilizes forward crash pad 2 and aft crash pad 4 constructed with the primary energy absorption layer constructed of tube array 34 oriented transverse to the vehicle fore-aft axis. Tube array 34 can be either a single layer, double layer, or multiple layers, using a material or materials that have properties of high ductility, high strength, and relatively low modulus. The thin-walled tubes comprising tube array 34 are filled with a very low-density cellular material such as metallic foam or honey-comb material. The tubes may also be filled with an expanding polymer foam. The thin-walled tubes comprising tube array 34 can have a cross sectional shape of circular, rectangular, or another closed geometric or organic shape. The internal structure of the thin-walled tubes would crush as tube array 34 was crushed in a crash situation. This configuration may be formed by a variety of methods including but not limited to extrusion, forging, casting, and other metal forming techniques. Tube array 34 may be generated as one continuous part or it may be formed from multiple discrete thin-walled tubes joined together. Tube array 34 may also be fabricated from a composite of engineered materials designed to give the desired properties of high ductility, high strength and relatively low modulus.

Figure 16A:
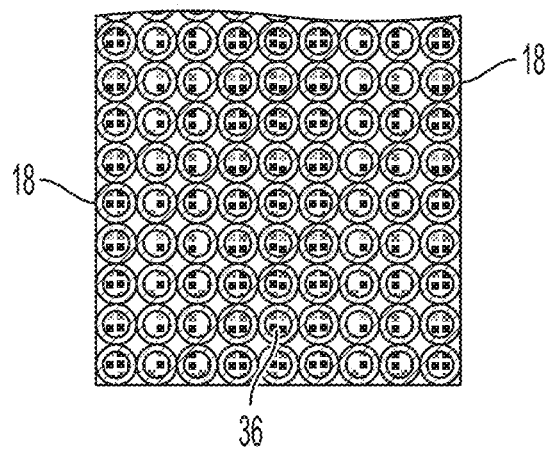
FIG. 16A is an enlarged view of a portion of a Uniform Deceleration Unit of FIG. 16B.
Figure 16B:
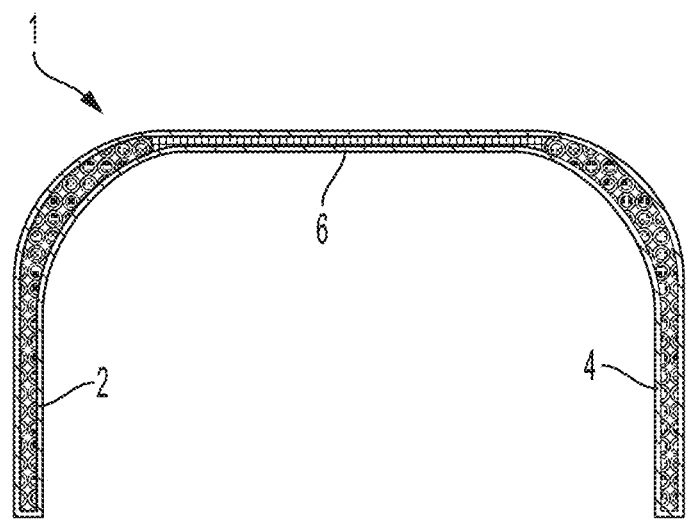
FIG. 16B depicts a Uniform Deceleration Unit with crash pads constructed of hollow tubes, running parallel to the fore-aft axis of the vehicle, joined together between two skin layers and filled with a low density cellular material.

FIG. 16 illustrates another embodiment that utilizes forward crash pad 2 and aft crash pad 4 constructed with the primary energy absorption layer constructed of tube arrays 36 oriented parallel to the vehicle fore-aft axis. Tube arrays 36 can be either a single layer, double layer, or multiple layers, using a material or materials that have high ductility, high strength, and relatively low modulus. Tube array 36 may be composed of thin-walled tubes having a cross section of circular, rectangular, or another closed geometric or organic shape. Thin-walled tubes are filled with a very low density cellular material such as metallic foam or honey-comb material. The tubes may also be filled with an expanding polymer foam. Thin-walled tubes may be sandwiched between layers of light-weight, high-strength material 18. The internal structure of the thin-walled tubes will buckle as tube array 36 is crushed in a crash situation. Such configuration may be formed by a variety of methods including but not limited to extrusion, casting, forging, and other metal forming techniques. Tube array 36 may be generated as one continuous part or it may be formed from multiple discrete thin-walled tubes joined together. Tube array 36 can also be fabricated from a composite of engineered materials designed to give the desired properties of high ductility, high strength and relatively low modulus.

Figure 17A:
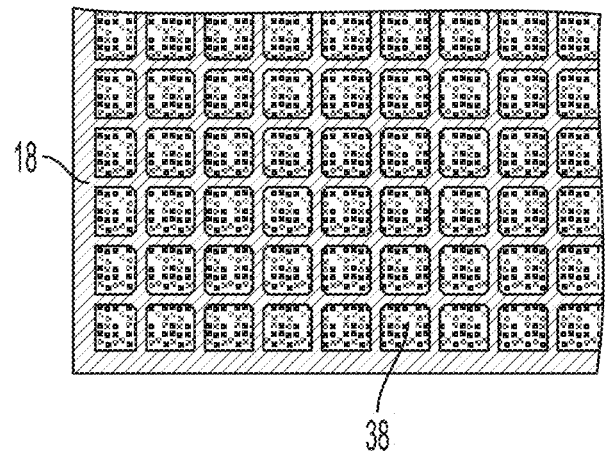
FIG. 17A is an enlarged view of a portion of a Uniform Deceleration Unit of FIG. 17B.
Figure 17B:
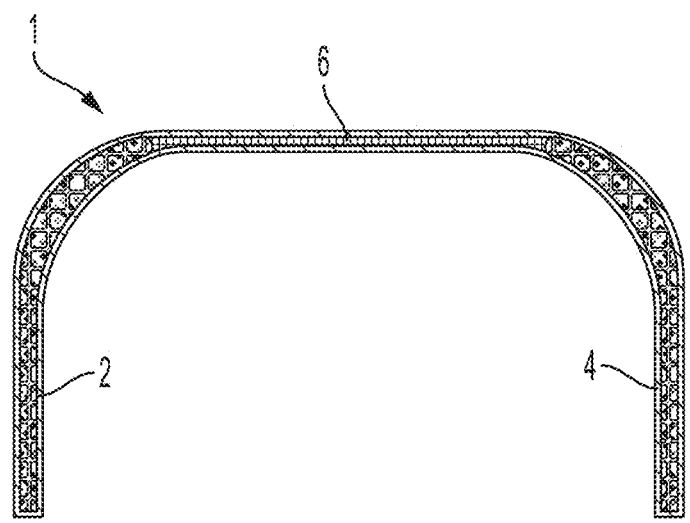
FIG. 17B depicts a Uniform Deceleration Unit with crash pads constructed of thin walled ribs and webs formed from a ductile high strength, low modulus, material joined together between two skin layers and filled with a viscous material.

FIG. 17 illustrates another embodiment that utilizes forward crash pad 2 and aft crash pad 4 constructed with the primary energy absorption layer 20 constructed of an array of a matrix of thin-walled ribs and webs 38 formed from material that has properties of high ductility, high strength, and relatively low modulus filled with a very low-density cellular material such as metallic foam or honey-comb material. The void spaces between the ribs and webs may also be filled with an expanding polymer foam. This configuration may be formed by a variety of methods including but not limited to extrusion, casting, forging, and other metal forming techniques.

Figure 18:
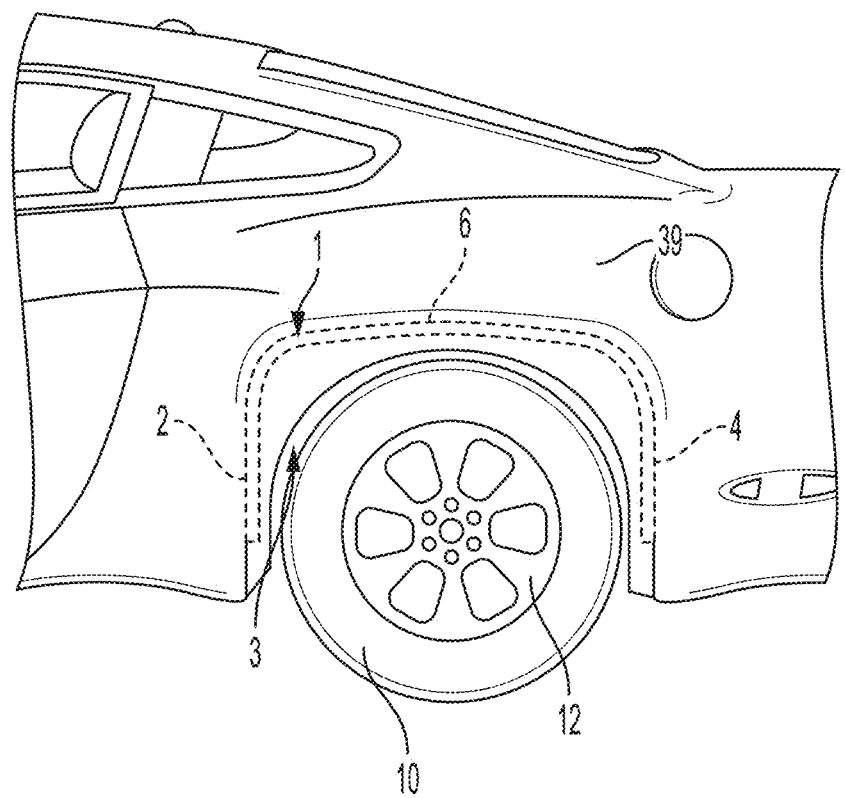
FIG. 18 depicts a Uniform Deceleration Unit deployed in a rear wheel well.

FIG. 18 illustrates another embodiment where a Uniform Displacement Unit is deployed in a rear fender 39 and wheel well 3 to dissipate the energy arising from a rear impact. The UDU 1 installed in a rear wheel well 3 will interact with the wheel in much the same manner as a front UDU 1. With a UDU 1 in place, the initial impact is absorbed by the existing vehicle components (i.e. tail-light assemblies, rear bumper, and fender), consistent with rear impacts where a UDU 1 is not in place. However, with a UDU 1 in place, once the impact reaches aft crash pad 4, aft crash pad 4 is forced to make contact with the inflated tire 10o and wheel assembly 12, as shown in FIG. 18. As the force acting on aft crash pad 4 and inflated tire to increases, the inflated tire 10 will de-bead and lose air pressure. Once air pressure is lost from inflated tire to, aft crash pad 4 will apply load to the wheel assembly 12. Both aft crash pad 4 and wheel assembly 12 will continue to deform as the load continues to increase. At a certain amount of deformation, connection beam 6 will begin to plastically deform, allowing aft crash pad 4 to push wheel assembly 12 and deflated tire 16 into forward crash pad 2. As will be obvious, the energy dissipation scenario is the mirror image of that with a UDU 1 installed in a front wheel well 3, and a frontal crash.

Figure 19:
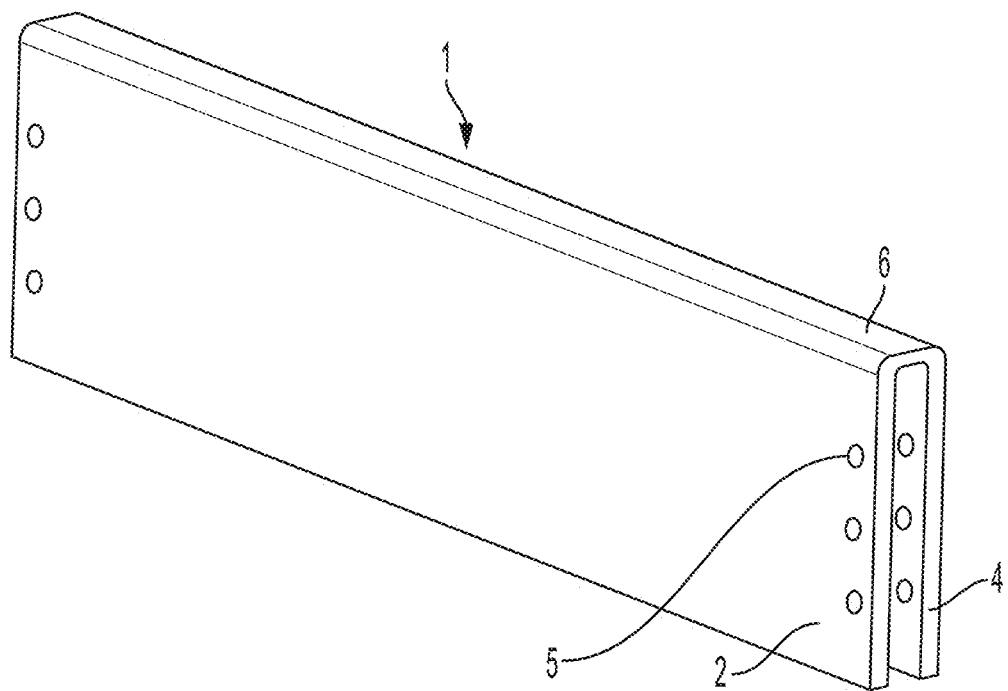
FIG. 19 is a perspective view of an inverted Uniform Deceleration Unit arranged for use in a side door.
Figure 20A:
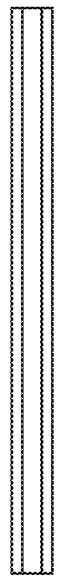
FIGS. 20A-20D illustrates various views of an inverted Uniform Deceleration Unit designed to be deployed in a side door.
Figure 20B:
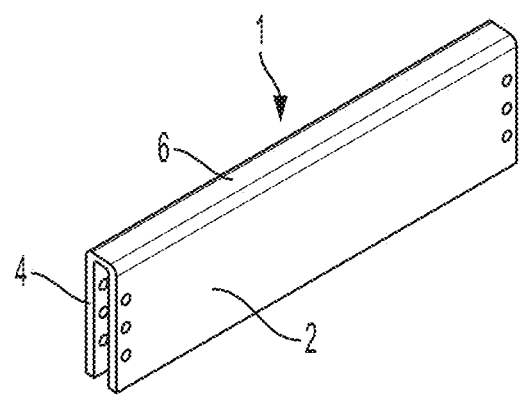
Figure 20C:
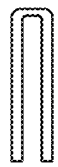
Figure 20D:
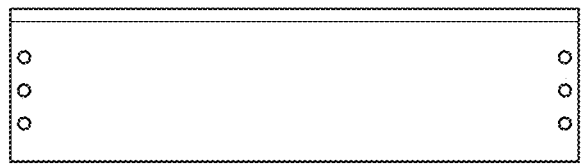

Although embodiments have been shown and described with a UDU 1 used in a wheel well 3 to protect against frontal and rear crashes, a UDU 1 also may be used in the front or rear doors to protect against side impact crashes. In embodiments in which a UDU 1 is installed into the vehicle's front or rear doors, a UDU 1 may be designed in the shape of a narrow inverted U, as illustrated in FIG. 19. Similar to configurations for frontal and rear crashes, a side door UDU may be comprised of an outer crash pad 2, connection beam 6, and inner crash pad 4.

FIG. 20 illustrates multiple views of the narrow inverted UDU designed to be installed in a side door. The shapes of the components are modified to fit into a side door, while maintaining energy dissipation advantages.

Figure 21:
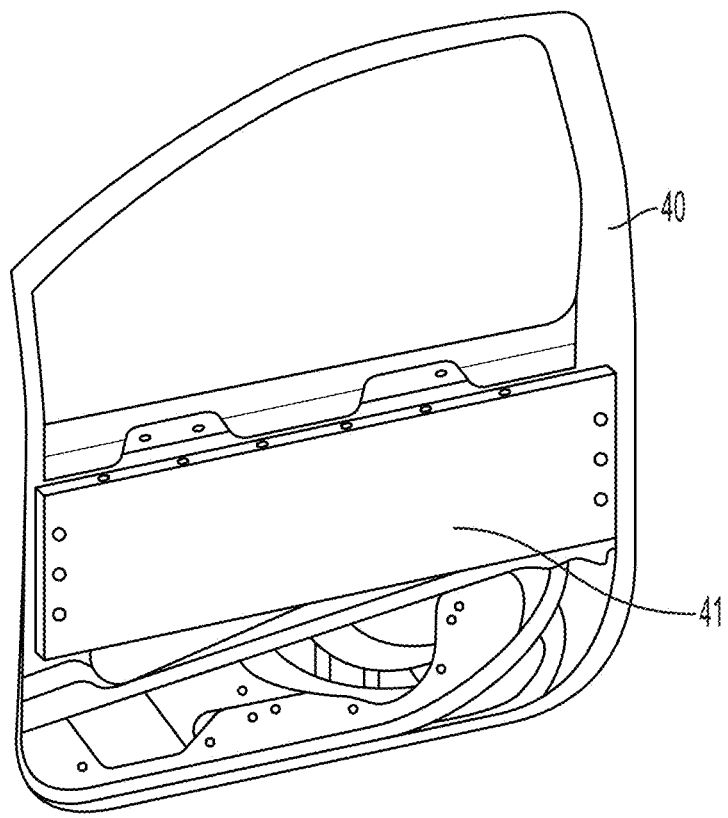
FIG. 21 depicts an inverted Uniform Deceleration Unit deployed in a side door of an automobile.

FIG. 21 is an illustration of the narrow inverted UDU 41 installed in side door 40 of a vehicle to dissipate the energy arising from a side impact. The energy-absorbing UDU 41 interacts with the outer skin of the automobile and the pillar framing side door 40 to distribute energy and minimize penetration of the passenger compartment and potential injury to occupants. Similarly, to a UDU designed for front impact, in some embodiments the system will be comprised of inner and outer crash pads connected by a short connection beam. The inner crash pad will be connected to the side door impact beam structures. The outer crash pad will be connected the outer skin of the door. The side door UDU 41 will also provide a high strength composite barrier that may, as crash energy is absorbed, also act to prevent penetration of vehicle components through the side door and therefore will help prevent intrusion of vehicle components into the driver's space in the vehicle.

Figure 22:
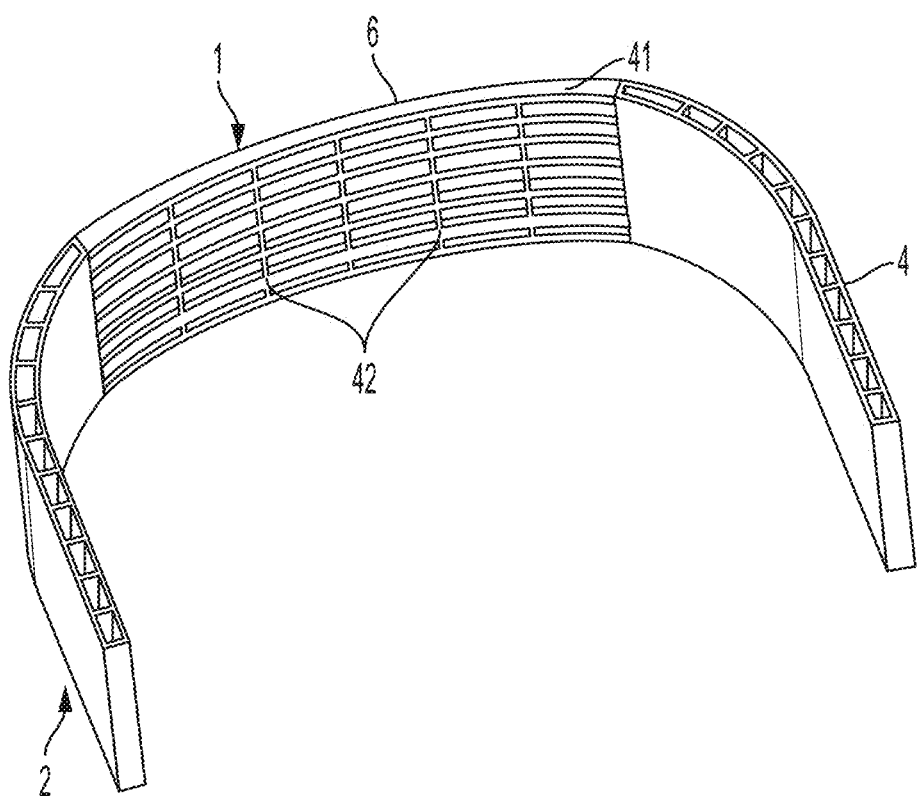
FIG. 22 illustrates a rib-and-web construction of a component, with primary load path ribs spanning the length of the UDU in the vehicle fore-aft direction, and the primary load path ribs connected by perpendicular stringer ribs.

FIG. 22 is an illustration of a rib-and-web construction of a UDU 1. In the embodiment that is shown, the forward crash pad 2 and the aft crash pad 4 are optionally constructed of a cellular material. Connection beam 6 may be formed of a multiplicity of primary load path ribs 41 spanning the length of the connection beam in the vehicle fore-aft direction, and primary load path ribs 41 are connected by perpendicular stringer ribs 42.

By way of elaborating but not limiting a UDU, specific illustrative methods of constructing crash pads, connection beam, and assembly are now discussed in more detail.

It may useful to treat forward crash pad, aft crash pad, and connection beam as components of an assembly. In one embodiment, fabrication of one or more components involves a high-quality aluminum alloy die casting to produce the high-tensile strength skin layers. The casting is a rib and web design with primary load path ribs spanning the length of the UDU in the vehicle fore-aft direction. The primary load path ribs may be connected by perpendicular stringer ribs that are spaced as required by the structure loads. FIG. 22 illustrates a representative construction of a single component. The function of the stringer ribs is to maintain spacing of the fore-aft ribs during the plastic deformation of a crash. The component may have a skin that is integrally cast in one of two configurations. The first involves cast pockets having a long dimension that is perpendicular to the fore-aft axis of the vehicle. The second configuration involves cast pockets having a long dimension that is parallel to the fore-aft axis of the vehicle.

The integral skin on both the inner and outer sides may be formed as part of a single casting, or alternatively only one of the inner and outer skins is formed as part of a casting, while the second skin may be bonded at a later assembly step using a high-strength adhesive. In this case, the skin acts as the "web" between the ribs. Low-density aluminum foam, for example having porosity between 80% and 94%, may be installed into the pockets of the skin and bonded in place by a high-strength adhesive. Aluminum foam can be applied in every pocket in the skin or it can be applied in every-other pocket in the skin or it can be applied in some other pattern to the pockets in the skin. The density of aluminum foam and the foam fill pattern in the cast skin may be optimized to balance cost against ability to dissipate crash impact energy.

Optional side openings on the skin might then be covered with aluminum plates shaped to cover the aluminum foam and seal the pocket openings. These cover plates are bonded to the cast skin and the aluminum foam using a high strength adhesive. The completed UDU assembly can optionally be coated to protect the assembly from moisture, road salt, engine fluids, dirt, gravel, and stones. The coating of choice is a poly-urea based tough coating.

In yet another configuration of a component, both the inner and outer skins are made as separate pieces. The inner and outer skins will sandwich an interior construction, which can be either low-density cellular materials without form, or a rib and web structure such as honeycombs or the like. In this case, pieces formed as aluminum foam or as other low-density cellular construction, with densities as determined by energy absorption requirements of the vehicle, are optionally bonded between the inner and outer skins using a high strength adhesive. The foam pieces can be spaced as determined by energy absorption calculations. The spaces between the aluminum foam pieces may be left empty or they may be filled with an expanding polymer foam. A polyurethane foam is one example of low-density cellular material. Application of such materials would have the effect of improving structural rigidity and reducing moisture infiltration into the structure.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A device for improving the safety of an automobile in a crash, the device comprising:
   first and second crash pads; and
   a connection beam disposed between the first and second crash pads;
   wherein the device absorbs and dissipates energy by converting kinetic energy into strain energy;
   wherein the device is mounted to a wheel well of the automobile and is arranged to interact with a wheel-and-tire assembly to absorb and dissipate energy; and
   wherein, when the wheel-and-tire assembly rotates as the crash progresses, the wheel-and-tire assembly interacts with the first crash pad to increase energy absorption and dissipation.

2. The device of claim 1, wherein the first and second crash pads and the connection beam are both elastically and plastically deformed and wherein at least ten percent of the kinetic energy of the automobile is converted into strain energy.

3. The device of claim 1, wherein:
   the first and second crash pads include forward and rear crash pads;
   the connection beam connects the forward and rear crash pads to one another; and
   each of the forward crash pad, rear crash pad, and connection beam absorb crash energy upon deflection.

4. The device of claim 1, wherein the device is an inverted "U" shape.

5. The device of claim 1, wherein the connection beam includes one or more cutouts to allow clearance for a front shock, a spring, or other such components.

6. The device of claim 1, wherein said connection beam includes multiple components.

7. The device of claim 1, wherein, during a frontal crash, the device interacts with at least one of a rocker, an A-pillar, and vehicle structures connected to rocker and A-pillar to distribute energy and minimize penetration of the passenger compartment and potential injury to occupants.

8. The device of claim 1, wherein, during a rear crash, the device interacts with a rear vehicle structure to distribute energy and minimize penetration of the passenger compartment and potential injury to occupants.

9. The device of claim 1, wherein the device is arranged to prevent said wheel-and-tire assembly from rotating out of alignment with the wheel well as the crash progresses.

10. The device of claim 1, wherein, during the crash, the connection beam initially absorbs energy by deforming elastically, and then further absorbs energy by deforming plastically.

11. The device of claim 1, wherein the first and second crash pads are constructed of a material having a mass per unit volume less than about 3,000 kg/m$^3$, and yield strength of at least 180 MPa.

12. The device of claim 1, wherein the first and second crash pads are constructed of a material having a Young's modulus of at least 500 MPa.

13. The device of claim 1, wherein the first and second crash pads are at least partially constructed of metallic foam having mass per unit volume less than about 1,000 kg/m$^3$.

14. The device of claim 1, wherein the first and second crash pads are constructed of metallic foam having a mass per unit volume of less than about 1,000 kg/m$^3$ sandwiched between two skin layers that are attached to the metallic foam.

15. The device of claim 1, wherein said first and second crash pads are at least partially constructed in a cellular fashion, either open or closed, to maximize capability to absorb energy while simultaneously minimizing mass.

16. The device of claim 11, wherein the first and second crash pads are constructed as a cellular layer sandwiched between two skin layers that are attached to the cellular layer.

17. The device of claim 1, wherein said connection beam is constructed as a cellular layer.

18. The device of claim 1, wherein the first and second crash pads and the connection beam are integrally formed as a single structure.

19. The device of claim 1, wherein each of the first and second crash pads include a matrix of ribs and webs that define one or more pockets.

20. The device of claim 1, wherein each of the first and second crash pads are constructed of hollow, thin-walled tubular sections sandwiched between two skins.

* * * * *